United States Patent
Rodman et al.

(10) Patent No.: US 9,879,581 B2
(45) Date of Patent: Jan. 30, 2018

(54) AFTER-TREATMENT SYSTEM

(71) Applicant: Caterpillar Inc., Peoria, IL (US)

(72) Inventors: Anthony C. Rodman, Peoria, IL (US);
J. Josh Driscoll, Dunlap, IL (US);
Bogdan Balea, Peoria, IL (US); Wade J. Robel, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 15/080,841

(22) Filed: Mar. 25, 2016

(65) Prior Publication Data

US 2017/0276044 A1    Sep. 28, 2017

(51) Int. Cl.
| | | |
|---|---|---|
| F01N 3/00 | (2006.01) |
| F01N 3/10 | (2006.01) |
| F01N 3/20 | (2006.01) |
| F01N 3/022 | (2006.01) |
| F01N 13/00 | (2010.01) |
| B01D 53/94 | (2006.01) |

(52) U.S. Cl.
CPC ........... *F01N 3/103* (2013.01); *B01D 53/944* (2013.01); *B01D 53/9418* (2013.01); *B01D 53/9436* (2013.01); *B01D 53/9468* (2013.01); *B01D 53/9477* (2013.01); *F01N 3/0222* (2013.01); *F01N 3/206* (2013.01); *F01N 3/2066* (2013.01); *F01N 13/009* (2014.06); *B01D 2255/904* (2013.01); *B01D 2255/9022* (2013.01); *B01D 2255/91* (2013.01); *F01N 2240/40* (2013.01); *F01N 2330/48* (2013.01)

(58) Field of Classification Search
USPC .......... 60/274, 286, 295, 297, 301, 303, 311
See application file for complete search history.

(56) References Cited

U.S. PATENT DOCUMENTS

| | | | |
|---|---|---|---|
| 8,413,432 B2 | 4/2013 | Mullins et al. | |
| 8,800,275 B2* | 8/2014 | Crandell | F01N 3/2066 60/295 |
| 9,032,709 B2* | 5/2015 | Patchett | B01D 5/0054 60/274 |
| 9,556,770 B2* | 1/2017 | Sandou | F01N 3/2066 |
| 2007/0256407 A1 | 11/2007 | Reuter | |

(Continued)

FOREIGN PATENT DOCUMENTS

| | | |
|---|---|---|
| EP | 2466084 | 6/2012 |
| EP | 2530268 | 12/2012 |

(Continued)

OTHER PUBLICATIONS

Bauma Previewnews, "Liebherr offering low emission engine technology," Mar. 10, 2016, 2 pp., downloaded from http://www.worldhighways.com/event-news/bauma/2016/news/liebherr-offering-low-emission-engine-technology/ Mar. 21, 2016.

(Continued)

*Primary Examiner* — Binh Q Tran

(74) *Attorney, Agent, or Firm* — Leydig, Voit & Mayer, Ltd.

(57) ABSTRACT

An after-treatment system includes, in series along an exhaust gas flow direction through the after-treatment system: a diesel oxidation catalyst (DOC), a diesel exhaust fluid (DEF) delivery device, a soot-reducing device and a selective catalytic reduction (SCR) catalyst.

20 Claims, 5 Drawing Sheets

(56) References Cited

U.S. PATENT DOCUMENTS

| | | | | |
|---|---|---|---|---|
| 2010/0077739 A1* | 4/2010 | Rodman | ................ | F01N 3/035 |
| | | | | 60/301 |
| 2010/0319324 A1 | 12/2010 | Mital | | |
| 2010/0326059 A1 | 12/2010 | Mital et al. | | |
| 2014/0331645 A1* | 11/2014 | Cole | .................... | F01N 3/2066 |
| | | | | 60/274 |
| 2015/0240682 A1 | 8/2015 | Gupta et al. | | |
| 2016/0326937 A1* | 11/2016 | Hornback | ............... | F01N 13/00 |

FOREIGN PATENT DOCUMENTS

| | | |
|---|---|---|
| FR | 2971810 | 8/2012 |
| WO | 201310543 | 7/2013 |

OTHER PUBLICATIONS bouwmachineweb.com, "Bauma 2016: Liebherr," Mar. 1, 2016, 2 pp., downloaded from http://bouwmachineweb.com/nieuws/bauma-2016-liebherr Mar. 21, 2016.

Liebherr, "Roll out of SCR on Filter . . . ," Vert Forum 2015, Mar. 20, 2015, 18 pp.

* cited by examiner

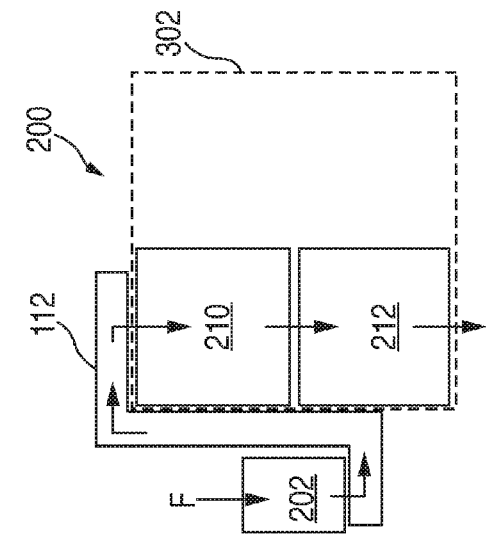
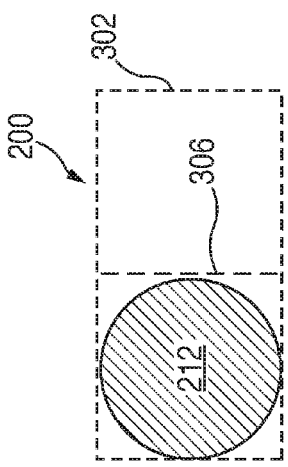
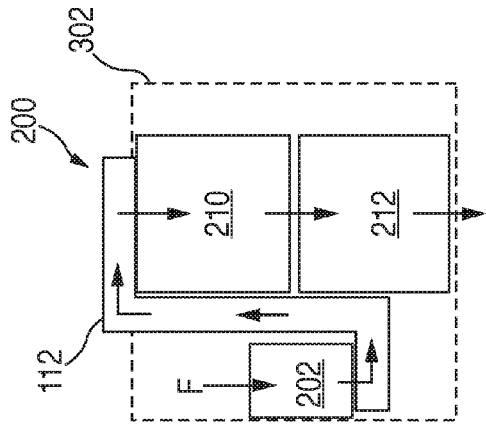
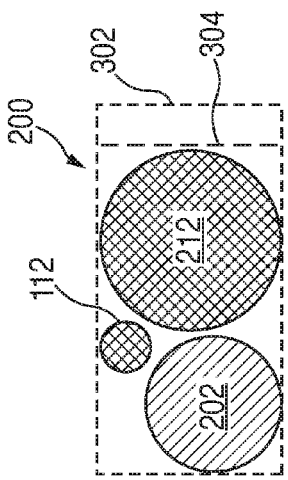
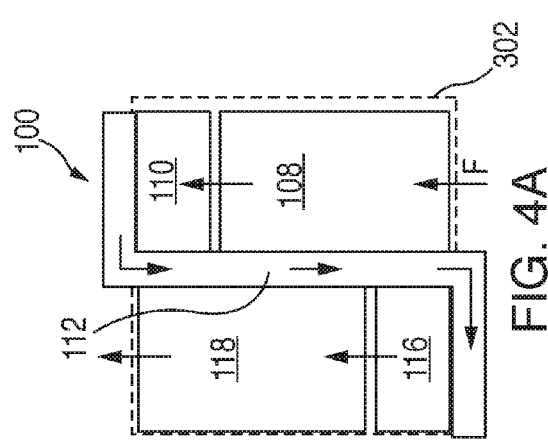
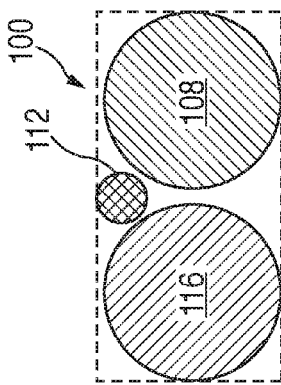

AFTER-TREATMENT SYSTEM

TECHNICAL FIELD

This disclosure relates generally to engine systems and, more particularly, to exhaust after-treatment systems and methods.

BACKGROUND

One known method for abating certain diesel engine exhaust constituents is by use of an exhaust after-treatment system that utilizes Selective Catalytic Reduction (SCR) of nitrogen oxides. In a typical SCR system, urea or a urea-based water solution is mixed with exhaust gas. In some applications, a urea solution is injected directly into an exhaust passage through a specialized injector device. The injected urea solution, which is sometimes referred to as diesel exhaust fluid (DEF), mixes with exhaust gas and breaks down to provide ammonia ($NH_3$) in the exhaust stream. The ammonia then reacts with nitrogen oxides ($NO_x$) in the exhaust at a catalyst to provide nitrogen gas ($N_2$) and water ($H_2O$).

In typical applications, especially for large engines, high efficiency diesel particulate filters (DPF) are used in conjunction with NOx reduction systems such as systems using SCR. Such systems are generally quite effective in filtering soot while also converting NOx emissions from diesel exhaust, but such systems are also relatively large in volume. For example, a typical combined DPF/SCR after-treatment system, which may also include AMOX and DOC catalysts, can be approximately 3-6 times engine displacement in volume, which makes it challenging to design and integrate into a vehicle or engine system and also increases overall machine weight and cost.

It has been proposed in the past to coat the SCR catalyst onto the DPF filter substrate to eliminate a separate substrate for the SCR catalyst and allow DEF injection upstream of the DPF, but the low temperature soot oxidation reaction and fast SCR reaction will compete for $NO_2$ during engine operation, which will generally result in high DPF balance points, i.e., a system balance at high soot loadings on the DPF, which is known to make the DPF prone to cracking or catastrophic failure, and requires DPF regeneration at a high temperature. High temperature regeneration often requires so-called active regeneration, which entails conducting the regeneration using a heat source or a high fuel concentration, both of which reduce fuel economy for the machine.

One example of a previously proposed after-treatment system can be seen in U.S. Pat. No. 8,413,432 to Mullins et al. ("Mullins"). Mullins describes a regeneration control system for a vehicle that includes a regeneration control module and a regeneration interrupt module. The regeneration control module selectively provides fuel to an oxidation catalyst for a regeneration event of a particulate filter that occurs during a predetermined melting period for frozen dosing agent. The regeneration interrupt module selectively interrupts the regeneration event and disables the provision of fuel to the oxidation catalyst before the regeneration event is complete when a temperature of a dosing agent injector that is located between the oxidation catalyst and the particulate filter is greater than a predetermined temperature. As can be appreciated, therefore, the system of Mullins requires active regeneration.

SUMMARY

The disclosure describes, in one aspect, an after-treatment system. The after-treatment system is suitable for use, for example, with a machine that includes an engine having an exhaust conduit, which is adapted to route a flow of exhaust gas from the engine during operation. The after-treatment system may be connected to the exhaust conduit and disposed to receive and treat the flow of exhaust gas from the engine. The after-treatment system includes a diesel oxidation catalyst (DOC) connected to the exhaust conduit and arranged to receive the flow of exhaust gas from the engine, a transfer conduit connected in a downstream end of the DOC, a diesel exhaust fluid (DEF) delivery device associated with the transfer conduit and adapted to selectively inject DEF into the transfer conduit to be carried in a downstream direction by gas passing through the transfer conduit during operation, a soot-reducing device connected to a downstream end of the transfer conduit, the soot-reducing device arranged to receive the gas passing through the transfer conduit during operation, and a selective catalytic reduction (SCR) catalyst connected to a downstream end of the DPF opposite the transfer conduit, the SCR catalyst arranged to receive the gas passing through the soot-reducing device during operation.

BRIEF DESCRIPTION OF THE DRAWINGS

FIGS. 4A and 4B are schematic configurations of a known system packaging envelope, FIGS. 5A and 5B are schematic configurations of a first embodiment of an after-treatment system in accordance with the disclosure and relative to the known packaging envelope, and FIGS. 6A and 6B are schematic configurations of a second embodiment of an after-treatment system in accordance with the disclosure and relative to the known packaging envelope.

DETAILED DESCRIPTION

Figure 1:
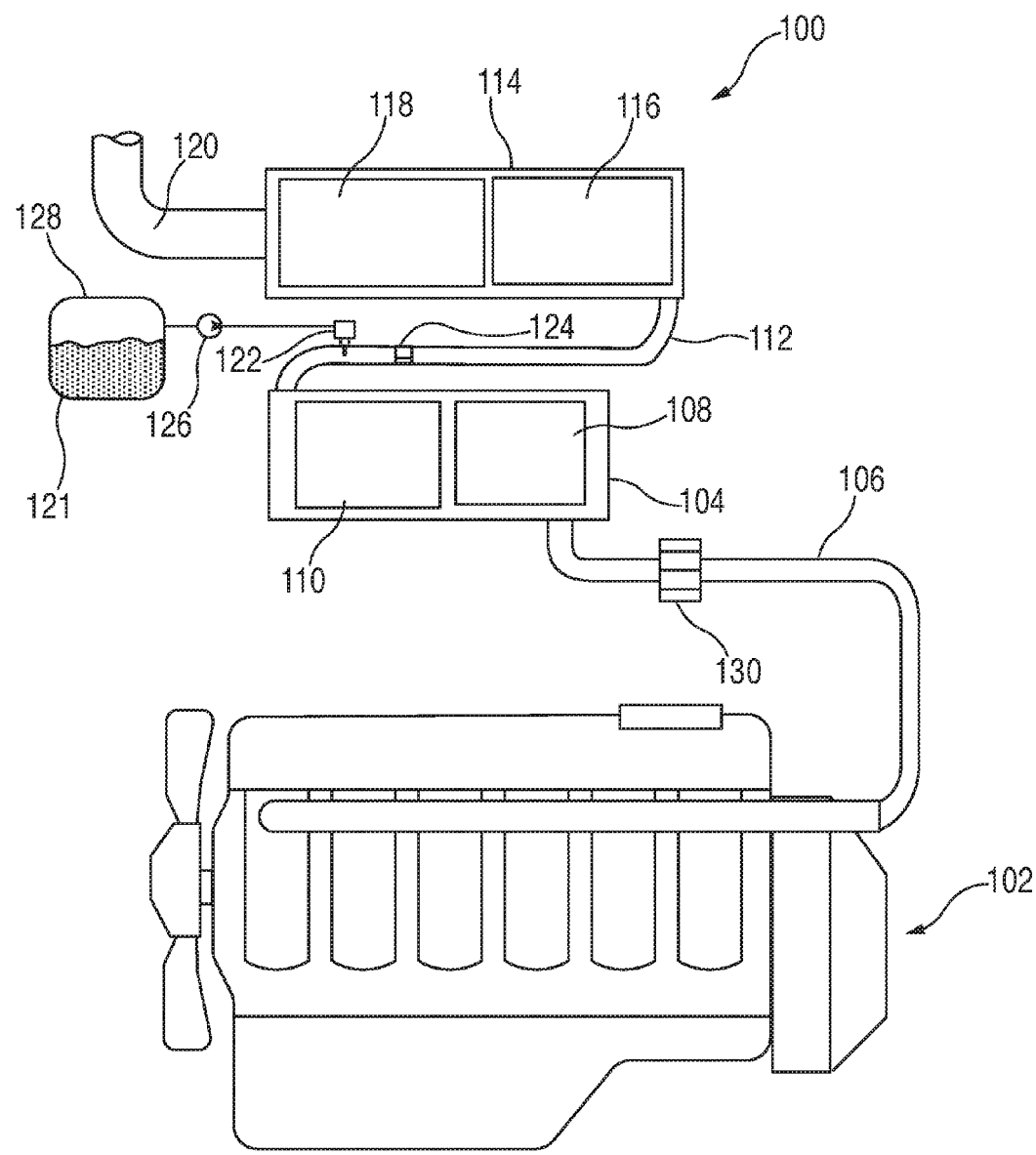
FIG. 1 is a block diagram of an engine having a known SCR system.
Figure 2:
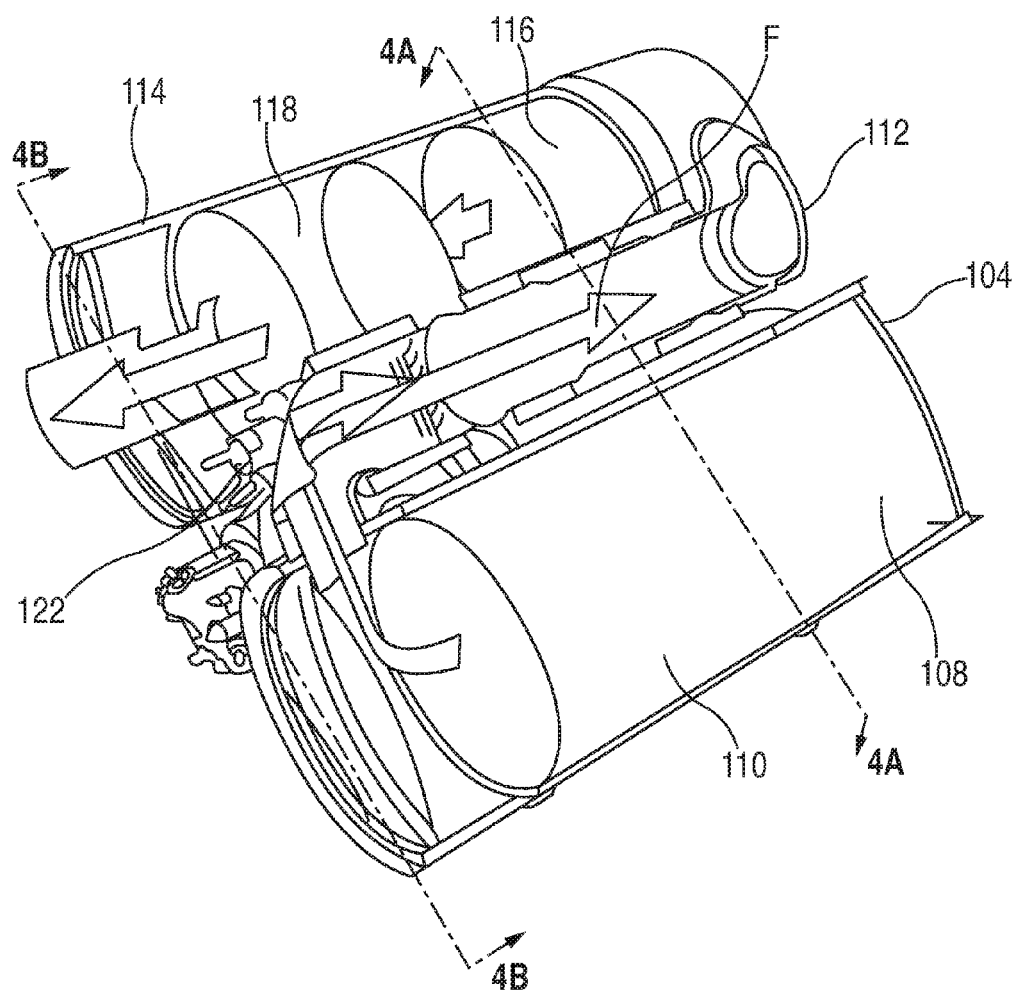
FIG. 2 is a partially sectioned outline view of a known exhaust treatment module.

FIGS. 1 and 2 are representations of an exhaust after-treatment system 100, which is known in the art. In the illustrated embodiment, the system 100 includes a first module 104 that is fluidly connected to an exhaust conduit 106 of the engine 102. During engine operation, the first module 104 is arranged to internally receive engine exhaust gas from the conduit 106. The first module 104 contains a diesel oxidation catalyst (DOC) 108 arranged in series, upstream from a diesel particulate filter (DPF) 110, each of which has a relatively large frame. It is noted that the CDPF 110 is a coated DPF (CDPF). Exhaust gas provided to the first module 104 by the engine 102 first passes through the DOC 108 and then through the CDPF 110 before entering a transfer conduit 112.

The transfer conduit 112 fluidly interconnects the first module 104 with a second module 114 such that exhaust gas from the engine 102 may pass through the first and second modules 104 and 114 in series before being released at a stack 120 that is connected to the second module. In the illustrated embodiment, the second module 114 encloses a SCR catalyst 116 and an Ammonia Oxidation Catalyst (AMOX) 118, each formed on its own respective substrate. The SCR catalyst 116 and AMOX 118 operate to treat exhaust gas from the engine 102 in the presence of ammonia, which is provided after degradation of DEF injected into the exhaust gas in the transfer conduit 112. A regeneration device 130 is disposed upstream of the first module 104 along the conduit 106. The regeneration device 130, which can be implemented as a fuel-fired heater, increases exhaust gas temperature for an active regeneration of the CDPF 110, selectively during operation as is known.

The DEF 121 is injected into the transfer conduit 112 by a DEF injector 122. The DEF 121 is contained within a reservoir 128 and is provided to the DEF injector 122 by a pump 126. As the DEF 121 is injected into the transfer conduit 112, it mixes with exhaust gas passing therethrough and is thus carried to the second module 114. To promote mixing of DEF with exhaust, a mixer 124 may be disposed along the transfer conduit 112. FIG. 2 is a partially sectioned outline view of the system 100, where same or similar structures as corresponding structures previously described are denoted by the same reference numerals previously used for simplicity. As shown in FIG. 2, the first and second modules 104 and 114 are disposed next to one another, with the transfer conduit 112 disposed between them. The DEF injector 122 is disposed on an upstream end of the transfer conduit 112 relative to a direction of exhaust gas flow, F.

Figure 3:
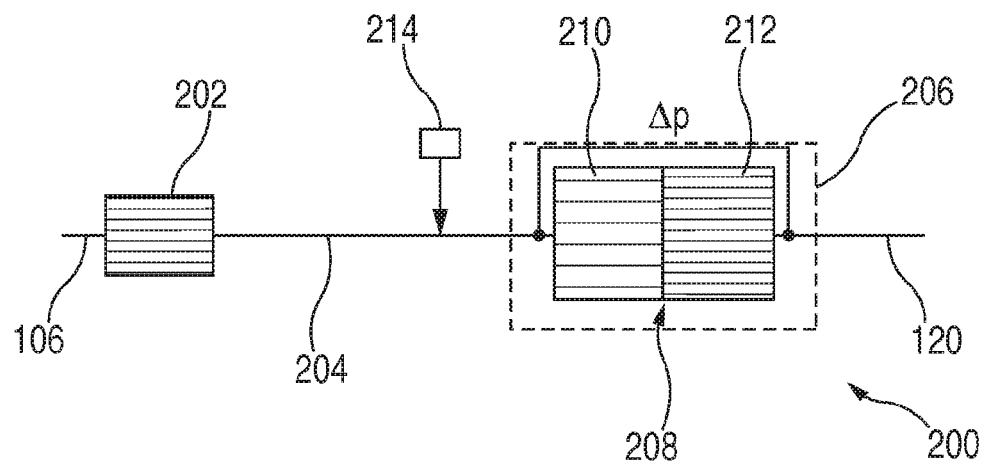
FIG. 3 is a block diagram of an after-treatment system in accordance with the disclosure.

FIG. 3 is a block diagram of an after-treatment system 200 in accordance with the disclosure. The system 200 is configured to replace the system 100 for the engine 102 (FIG. 1) but without necessarily use of the regeneration device 130 and with a smaller package size, as will be described hereinafter. The system 200 includes a DOC 202, which in this embodiment has a smaller diameter and an overall smaller volume than the DOC 108 (FIG. 1). The DOC 202 may optionally further include a relatively small NOx absorber to improve flow temperature of exhaust gas temperature flowing there through. The system 200 is arranged such that the exhaust conduit 106 from the engine 102 (FIG. 1) provides exhaust gas from the engine 102 to the DOC 202, which operates in the known fashion. A transfer conduit 204 fluidly interconnects the DOC 202 to a treatment module 206, which is connected to the stack 120 (also see FIG. 1) either directly or through a muffler (not shown). The treatment module 206 includes a series-compact device 208, which in the illustrated embodiment includes a DPF 210, and a combined SCR plus AMOx (SCR/AMOx) 212. A DEF injector 214 is disposed along the transfer conduit 204 and arranged to inject DEF therein between the DOC 202 and the series-compact device 208 during operation such that injection of DEF occurs downstream of the DOC 202 and upstream of the series-compact device 208.

For achieving desired emissions, the DPF 210 in the illustrated embodiment is a monolithic, wall-flow type substrate that can be made from advanced cordierite (AC) or aluminum titanate (AT) having an asymmetric channel (ACT) construction with larger inlet and smaller outlet channels. The DPF 210 shown has about 300 channels per square inch (cpsi) and is uncoated, uncatalyzed or includes a hydrolysis coating. During operation, the DOC 202 creates $NO_2$ from NO and $O_2$ present in the exhaust stream. The $NO_2$ created by the DOC 202 is carried to the DPF 210 to support a passive regeneration of the DPF 210 at a relatively low temperature of about 200 def. C.

The SCR/AMOx 212 of the system 200 in the illustrated embodiment is built on a substrate having about 600 cpsi that is physically connected to the substrate of the DPF 210 or is otherwise in close proximity thereto within the treatment module 206 to act as a single substrate. In the illustrated embodiment, the system 200 operates to remove more than 98% of engine soot on a mass or particulate count basis, and reduces NOx by more than 96% on a mass basis.

In general, the after-treatment system 200 may include additional or alternative structures for treating the exhaust gas stream provided from the engine 102. For example, in an alternative embodiment, a soot-reducing, soot-filtering or soot-removing device such as an electrostatic precipitator, a plasma burner or any other known soot-removing device may be used instead of, or in addition to, the DPF 210 in the after-treatment system 200. The term soot-reducing device, as used herein, is contemplated to include any structure that operates to at least partially remove soot and/or other particulates from an exhaust stream of an engine as the exhaust stream passes through, over or around the soot-reducing device. Moreover, in an alternative embodiment, the after-treatment system 200 may be configured and/or sized to remove an optimized fraction of soot, for example, between 10% and 90% on a mass or particulate count basis, and to reduce NOx by an optimized fraction, for example, more than 70% on a mass basis, from the flow of exhaust from the engine.

INDUSTRIAL APPLICABILITY

This disclosure relates to after-treatment systems for diesel engines used alone or in conjunction with other power sources and types in a machine. More particularly, the disclosure describes use of an uncatalyzed or hydrolysis coated low backpressure DPF, which allows DEF dosing upstream of a single can with a series DPF and SCR catalyst. One challenge in designing and integrating a combined DPF/SCR system for an engine in a machine is the requirement for DEF injection to be downstream of the DOC or a catalyzed DPF to avoid ammonia oxidation to NOx. The described embodiments advantageously reduce package size and weight for the after-treatment devices as compared with known systems while maintaining passive soot oxidation capability, i.e., the ability to avoid using active DPF regeneration, which avoid the cost, complexity and fuel consumption increase associated with active regeneration. The described systems and methods, therefore, provide greater flexibility than known systems have to integrate low or high temperature thermal management. Additionally, the systems in accordance with the disclosure provide the capability of moving or relocating the DPF from in-series with the DOC, as is the case in known systems, to a remote location, for example, on the engine. This flexibility also allows the DOC aspect ratio to be optimized for packaging resulting in considerable height and width reductions of 15% or more as compared to previously known systems. Overall, the disclosed systems and methods provide a compact, high efficiency package that works with low or high temperature DPF regeneration.

The present disclosure is applicable to internal combustion engines operating in mobile or stationary applications. The disclosed systems are advantageously more compact the systems having comparable emission constituent abatement performance. The systems in accordance with the present disclosure are simpler and more cost effective to operate in that the DPF used is suitable for both passive and active regeneration, which makes use of an active regeneration device optional.

To illustrate the package size benefit of the system in accordance with the present disclosure, various qualitative representations are compared. In general, while the DPF 210 and SCR/AMOx 212 may have a diameter that is comparable to the SCR catalyst 116 and AMOX 118 (FIG. 1), the combined series-compact device 208 has an overall length that is quite shorter than the overall combined substrate length of all devices used in the system 100 (FIG. 1), which greatly reduces the overall package size of the various systems. This is discussed below relative to FIGS. 4A and 4B as compared to FIGS. 5A, 5B, 6A and 6B.

More specifically, FIG. 4A qualitatively shows a packaging envelope 302 for the components of the system 100 (FIG. 1), in block form, from a top perspective, and FIG. 4B shows the packaging envelope 302 from a front perspective. As can be seen from these figures, where arrows "F" denote the flow of exhaust gas through each system, a footprint of the packaging envelope 302 is defined by the space that is required to accommodate arrangement of the DOC 108 and CDPF 110 on the right side, and the SCR catalyst 116 and AMOx 118 on the left side of FIG. 4A in the orientation shown. A cross sectional area of the packaging envelope 302 is similarly defined by the diameters of the various substrates mentioned above, as well as by the diameter of the transfer conduit 112, as shown in FIG. 4B.

FIGS. 5A and 5B show the components of the system 200 in accordance with the disclosure arranged within the packaging envelope 302 of the system 100 for comparison and to illustrate the space-saving nature of the system 200 over the system 100. As shown, the arrangement of the smaller-diameter DOC 202 allows the centerline of the series-combined substrates for the DPF 210 and the SCR/AMOx 212 to move closer to a centerline of the DOC 202, which results in an overall narrower combined width for these components and more space being available to route the transfer conduit 112. Therefore, and as can be seen from FIGS. 5A and 5B, the volume 304 required to contain or package the system 200 is about 15% less than the volume occupied by the packaging envelope 302, with additional space being available around the components to route other machine components, add shielding, and the like.

FIGS. 6A and 6B show the components of the system in accordance with an alternative embodiment of the disclosure, in which the DOC 202 is mounted remotely from the remaining components of the system 200, for example, on the engine or anywhere along the exhaust conduit supplying exhaust gas from the engine to the system 200. In this embodiment, the DOC 202 is placed outside from the packaging envelope 302 due to its remote mounting. The series-combined substrates for the DPF 210 and the SCR/AMOx 212 are moved to one side of the envelope thus reducing the volume 306 required to contain or package the system 200 by about 50% or more relative to the volume occupied by the packaging envelope 302.

Figure 7:
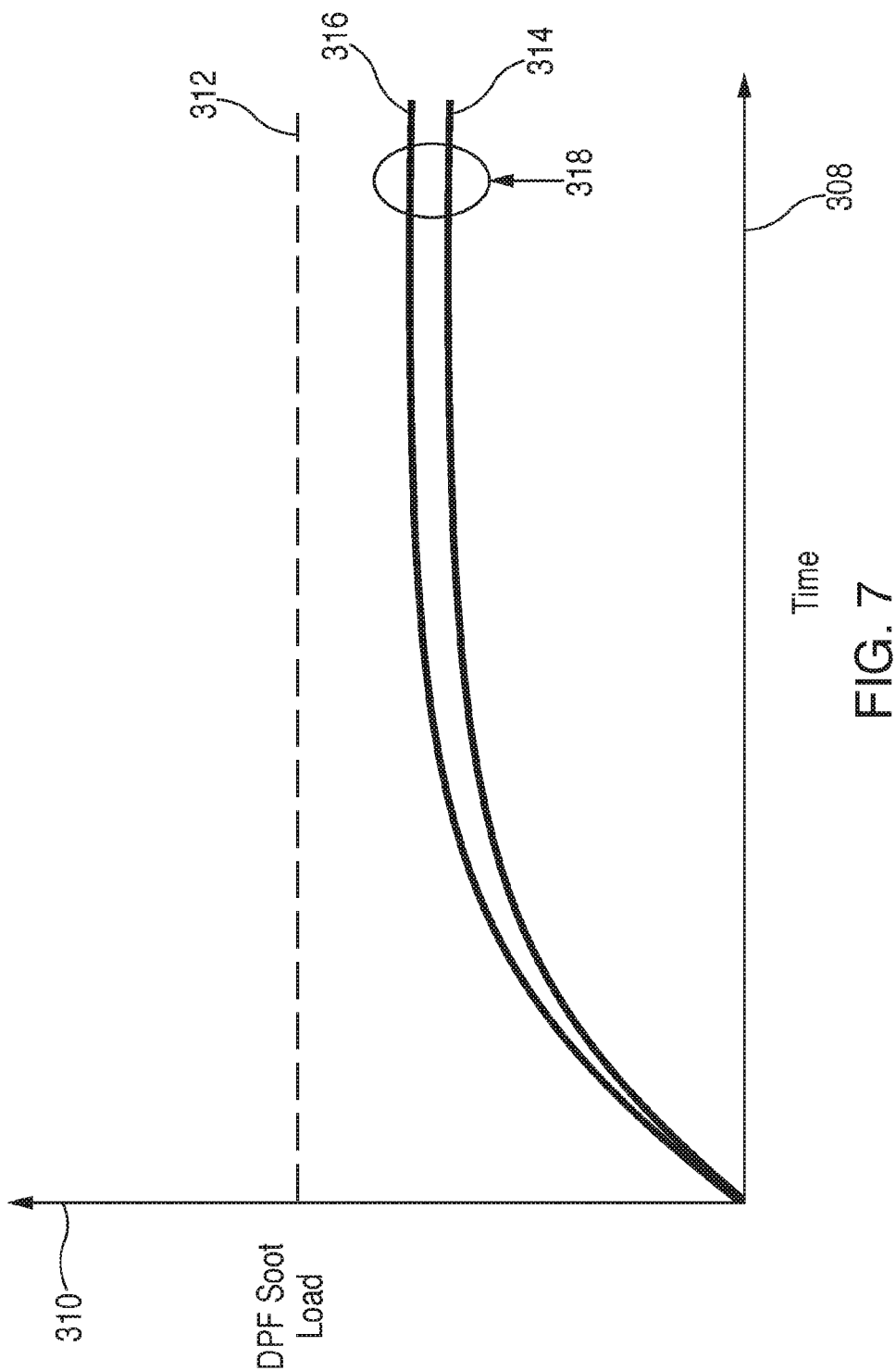
FIG. 7 is a graph showing operation of an after-treatment system over time in accordance with the disclosure.

A qualitative graph showing the soot loading in the DPF of the system 200 as compared to the system 100 over time is shown in FIG. 7. In the graph, the horizontal axis 308 represents time, for example, in hours, and the vertical axis 310 represents soot loading, for example, as a percentage of a critical soot loading 312 at which the DPF plugging with soot particles is beyond a desired extent and may render the DPF essentially plugged. The graph shows two curves, a first curve 314 and a second curve 316. The first curve 314 represents a soot loading over time of the CDPF 110 (FIG. 1) of the system 100, which is considered as the baseline system. The second curve 316 represents a soot loading over time of the DPF 210 of the system 200 (FIG. 3) of the system 200 in accordance with the disclosure.

As can be seen from the graph, the soot loading in both DPFs increases initially before stabilizing and reaching a balance point over time because in both systems 100, 200 the DPF continuously regenerates during operation and reaches a steady-state soot loading. When comparing the curves 314 and 316, it can be seen that the loading in the DPF 210 in the system 200 settles at a soot loading that is higher than the corresponding soot loading in the CDPF 110 in the system 100. However, although the soot loading in the DPF 210 is higher than the loading in the CDPF 110, both are still below the critical soot loading 312. As a practical matter, the higher soot loading in the DPF 210, which may increase the pressure drop across the DPF, will not appreciably affect engine operation given the relatively higher cell density of the SCR/AMOx 212 used in the system 200 as compared to the system 100.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:
1. An after-treatment system for use in a machine having an engine, the engine having an exhaust conduit, the exhaust conduit adapted to route a flow of exhaust gas from the engine during operation of the engine, the after-treatment system being adapted for connection to the exhaust conduit and disposed to receive and treat the flow of exhaust gas from the engine, the after-treatment system comprising:
 a diesel oxidation catalyst (DOC) connected to the exhaust conduit and arranged to receive the flow of exhaust gas from the engine;
 a transfer conduit connected to a downstream end of the DOC;
 a diesel exhaust fluid (DEF) delivery device fluidly coupled to the transfer conduit and adapted to selectively inject DEF into the transfer conduit to be carried in a downstream direction by gas passing through the transfer conduit during operation;
 a soot-reducing device connected to a downstream end of the transfer conduit, the soot-reducing device being arranged to receive the gas passing through the transfer conduit during operation; and
 a selective catalytic reduction (SCR) catalyst connected to a downstream end of the soot-reducing device opposite the transfer conduit, the SCR catalyst being arranged to receive the gas passing through the soot-reducing device during operation,
 wherein each of the DOC, the soot-reducing device, and the SCR catalyst has a generally cylindrical shape, and
 wherein a diameter of the DOC is smaller than a diameter of the soot-reducing device and smaller than a diameter of the SCR catalyst.

2. The after-treatment system of claim 1, wherein the soot-reducing device is an uncatalyzed soot-reducing device.

3. The after-treatment system of claim 1, wherein the soot-reducing device includes a hydrolysis catalyst.

4. The after-treatment system of claim 1, wherein the soot-reducing device is a diesel particulate filter (DPF) that is made from a monolithic, thin wall-flow type substrate.

5. The after-treatment system of claim 4, wherein the DPF is made from advanced cordierite (AC) or aluminum titanate (AT).

6. The after-treatment system of claim 5, wherein the DPF has an asymmetric channel (ACT) construction such that a size of inlet channels of the DPF is larger than a size of outlet channels of the DPF.

7. The after-treatment system of claim 4, wherein the DPF has about 300 channels per square inch (cpsi).

8. The after-treatment system of claim 1, wherein the SCR catalyst further includes an ammonia oxidation catalyst (AMOx).

9. The after-treatment system of claim 8, wherein the AMOx catalyst is formed as a coating on the SCR catalyst.

10. The after-treatment system of claim 1, wherein the SCR catalyst is built on a substrate having about 600 cpsi.

11. The after-treatment system of claim 1, wherein a substrate of the SCR catalyst and a substrate of the soot-reducing device are each enclosed in a common housing.

12. The after-treatment system of claim 1, wherein the after-treatment is configured to remove more than 98% of soot on a mass or particulate count basis, and to reduce NOx by more than 96% on a mass basis, from the flow of exhaust gas from the engine.

13. The after-treatment system of claim 1, wherein a ratio of the diameter of the DOC to the diameter of the soot-reducing device is less than about 2/3.

14. The after-treatment system of claim 1, wherein the diameter of the soot-reducing device is equal to the diameter of the SCR catalyst.

15. The after-treatment system of claim 1, wherein the DOC further includes structures arranged to absorb NOx from the flow of exhaust gas from the engine.

16. The after-treatment system of claim 1, wherein the DOC, the transfer conduit, the soot-reducing device, and the SCR catalyst are arranged fluidly in series within the after-treatment system, the DOC being located upstream of the transfer conduit along a flow direction through the after-treatment system, the transfer conduit being located upstream of the soot-reducing device along the flow direction through the after-treatment system, and the soot-reducing device being located upstream of the SCR catalyst along the flow direction through the after-treatment system, the flow direction through the after-treatment system fluidly extending from the DOC toward the SCR catalyst.

17. The after-treatment system of claim 1, wherein the DOC is mounted closer to the engine than to the soot-reducing device.

18. The after-treatment system of claim 1, wherein the soot-reducing device is a diesel particulate filter (DPF) that is configured for passive regeneration at a temperature of about 200 deg. C.

19. The after-treatment system of claim 1, further comprising an active regeneration device disposed in fluid communication with the soot-reducing device at a location upstream of the soot-reducing device, the active regeneration device being configured to increase a temperature of the flow of exhaust upstream of the soot-reducing device.

20. The after-treatment system of claim 11, wherein the substrate of the SCR catalyst and the substrate of the soot-reducing device are the only exhaust after-treatment substrates disposed within the common housing.

* * * * *